United States Patent
Ishizaki

(10) Patent No.: US 12,361,284 B2
(45) Date of Patent: Jul. 15, 2025

(54) MACHINE LEARNING APPARATUS AND METHOD FOR MACHINE LEARNING BY USING TENSOR INCLUDING PLURALITY OF AXES AS INPUT

(71) Applicant: FUJITSU LIMITED, Kawasaki (JP)

(72) Inventor: Ryo Ishizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 17/371,823

(22) Filed: Jul. 9, 2021

(65) Prior Publication Data

US 2022/0114442 A1    Apr. 14, 2022

(30) Foreign Application Priority Data

Oct. 9, 2020    (JP) .................................. 2020-171167

(51) Int. Cl.
  *G06N 3/08* (2023.01)
  *G06F 18/20* (2023.01)
  *G06F 18/211* (2023.01)
  *G06F 18/213* (2023.01)

(52) U.S. Cl.
  CPC .............. *G06N 3/08* (2013.01); *G06F 18/211* (2023.01); *G06F 18/213* (2023.01); *G06F 18/29* (2023.01)

(58) Field of Classification Search
  CPC .......... G06N 3/08; G06N 3/044; G06N 3/084; G06N 3/0442; G06N 3/0895; G06N 3/09; G06N 3/091; G06N 3/092; G06N 3/094; G06N 3/096; G06N 3/098; G06N 3/0985; G06F 18/211; G06F 18/213; G06F 18/29; G06Q 40/02
  See application file for complete search history.

(56) References Cited

U.S. PATENT DOCUMENTS

| 9,317,567 | B1 | 4/2016 | Lu et al. | |
| 9,934,462 | B1 * | 4/2018 | Healey | G06N 3/045 |
| 10,861,213 | B1 * | 12/2020 | Holzer | G06T 7/20 |
| 11,829,867 | B2 * | 11/2023 | Iwakura | G06N 5/022 |
| 2015/0261846 | A1 * | 9/2015 | Hall | G06N 3/045 |
| | | | | 707/738 |
| 2019/0130270 | A1 | 5/2019 | Nicol et al. | |

(Continued)

FOREIGN PATENT DOCUMENTS

| CN | 112292816 | A | * | 1/2021 | ............ | G06F 17/16 |
| CN | 110993094 | B | * | 5/2023 | ........... | G06K 9/6256 |

(Continued)

*Primary Examiner* — Mohamed Abou El Seoud
(74) *Attorney, Agent, or Firm* — Fujitsu Intellectual Property Center

(57) ABSTRACT

A non-transitory computer-readable recording medium having stored therein a machine learning program executable by one or more computers, the machine learning program including an instruction for generating a tensor comprising a first axis, a second axis, and a third axis, the first axis and the second axis representing relationships of a plurality of nodes included in graph information including data representing attributes of the plurality of nodes in the hierarchical structure, the third axis representing separately first data included in a first layer of the hierarchical structure and second data included in a second layer of the hierarchical structure, and an instruction for training a machine learning model by using the tensor as an input.

15 Claims, 16 Drawing Sheets

(56) References Cited

U.S. PATENT DOCUMENTS

| | | | |
|---|---|---|---|
| 2020/0151580 A1* | 5/2020 | Horesh | G06N 3/084 |
| 2021/0240439 A1* | 8/2021 | Ge | G06F 9/30014 |
| 2022/0092336 A1* | 3/2022 | Yu | G06V 30/1914 |
| 2022/0415059 A1* | 12/2022 | Smolyanskiy | B60W 60/0011 |
| 2023/0069986 A1* | 3/2023 | Tamiya | G06N 20/00 |
| 2023/0342595 A1* | 10/2023 | Wang | G06N 3/084 |
| 2024/0211539 A1* | 6/2024 | Nakao | G06F 17/18 |

FOREIGN PATENT DOCUMENTS

| | | | |
|---|---|---|---|
| CN | 117876551 A * | 4/2024 | |
| JP | 2019-164753 A | 9/2019 | |
| JP | 2019-191781 A | 10/2019 | |

* cited by examiner

FIG.10

EXAMPLE OF INPUT DATA

- 31a NODE INFORMATION (TWO-DIMENSIONAL)
- 31b CONNECTING INFORMATION 1
- 31c HIERARCHICAL INFORMATION (TWO-DIMENSIONAL)
- 31d CONNECTING INFORMATION 2

| P1 | C1 | E1 | V1 | P2 | C2 | E2 | V2 | |
|----|----|----|------|----|----|----|-----|---|
| A | B | 1 | 1000 | a | b | 1 | 0 | |
| A | B | 1 | 1000 | b | c | 1 | 20 | (1) |
| A | B | 1 | 1000 | b | d | 1 | 30 | |
| ... | ... | ... | ... | ... | ... | ... | ... | |
| E | H | 1 | 2000 | e | f | 1 | 10 | |
| E | H | 1 | 2000 | e | g | 1 | 20 | (2) |
| E | H | 1 | 2000 | e | h | 1 | 30 | |
| ... | ... | ... | ... | ... | ... | ... | ... | |
| A | C | 1 | 2000 | a | b | 1 | 0 | |
| A | D | 1 | 3000 | a | b | 1 | 0 | |
| A | E | 0 | 0 | a | b | 1 | 0 | (3) |
| B | A | 1 | 1000 | a | b | 1 | 0 | |
| ... | ... | ... | ... | ... | ... | ... | ... | |
| H | G | 0 | 0 | e | h | 1 | 300 | (4) |

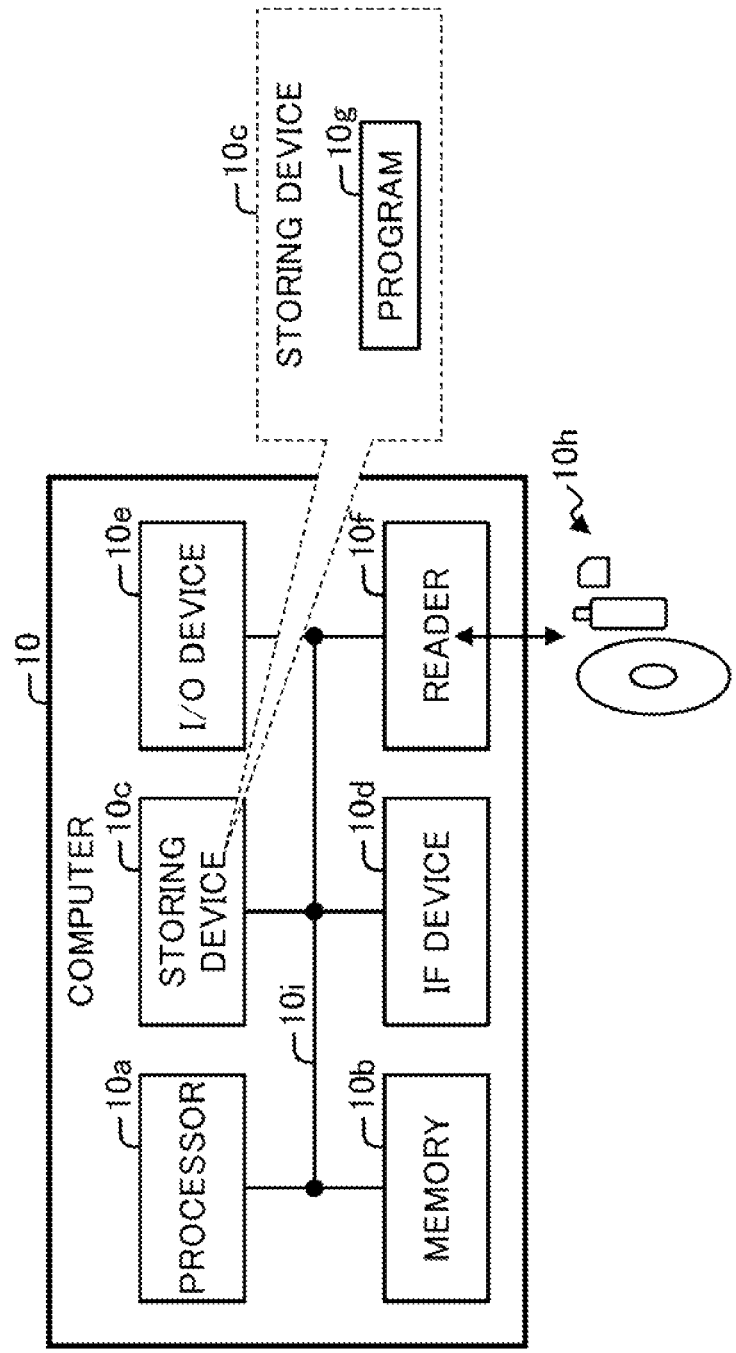

MACHINE LEARNING APPARATUS AND METHOD FOR MACHINE LEARNING BY USING TENSOR INCLUDING PLURALITY OF AXES AS INPUT

CROSS-REFERENCE TO RELATED APPLICATION

This application is based upon and claims the benefit of priority of the prior Japanese Patent application No. 2020-171167, filed on Oct. 9, 2020, the entire contents of which are incorporated herein by reference.

FIELD

The embodiment discussed herein is directed to machine learning.

BACKGROUND

A technique of graph structure learning has been known which executes machine learning, for example, Deep Learning (DL), on a model, using data having a graph structure which expresses the relationship between targets, such as people and articles, in a connecting relationship of nodes. An exemplary technique of graph structural learning is "Deep Tensor (DT)". DT is a technique to perform machine learning by inputting a core tensor obtained by tensor decomposition of data having a graph structure expressed in tensor form into a neural network.

The data having the graph structure may be referred to as "graph information" or "tensor". A tensor is a mathematical expressing form of a graph structure. Hereinafter, graph-structured data expressed in the tensor form may be referred to as "tensor-form data".

Tensor-form data is data expressing a connecting matrix of nodes in a graph structure in two axes of tensor (for example, referred to as "axis 1" (first axis), "axis 2" (second axis)). In addition to the above two axes, tensor-form data can also express attribute information of a node in "other axes".

For example, related arts are disclosed in Japanese Laid-open Patent Publication No. 2019-191781, Japanese Laid-open Patent Publication No. 2019-164753, U.S. Patent Publication No. 2019/0130270, and U.S. Pat. No. 9,317,567.

SUMMARY

According to an aspect of the embodiments, a non-transitory computer-readable recording medium having stored therein a machine learning program executable by one or more computers, the machine learning program including: an instruction for generating a tensor including a first axis, a second axis, and a third axis, the first axis and the second axis representing relationships of a plurality of nodes included in graph information including data representing attributes of the plurality of nodes in the hierarchical structure, the third axis representing separately first data included in a first layer of the hierarchical structure and second data included in a second layer of the hierarchical structure, and an instruction for training a machine learning model by using the tensor as an input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of input-data;

FIG. 16 is a block diagram illustrating an example of a hardware configuration of a computer.

DESCRIPTION OF EMBODIMENT(S)

Figure 1:
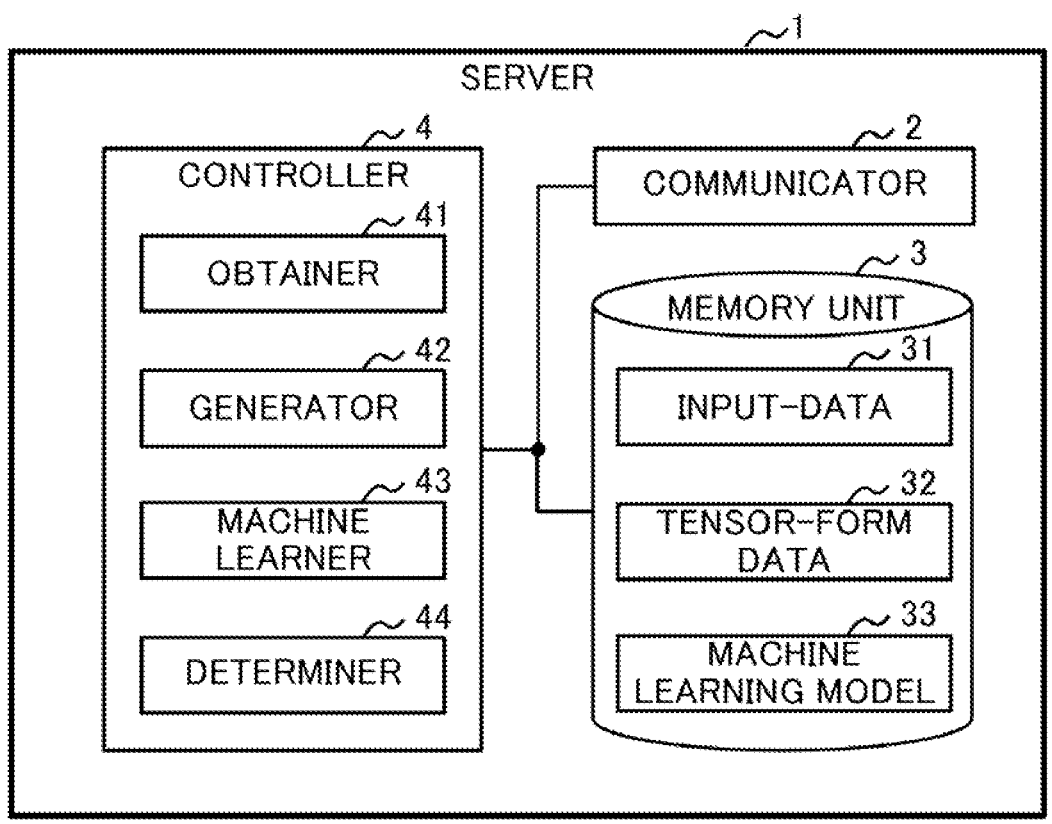
FIG. 1 is a block diagram schematically illustrating an example of the functional configuration of a server according to an embodiment.

In order to enhance the performance of the DT, it is conceivable to increase the information used for machine learning by combining multiple pieces of data, for example, to form the attribute information of the nodes included in the graph information to have attributes defined in a hierarchical structure. In this instance, the "other axes" expressing the attribution information in tensor-form data are two or more axes (for example, referred to as "axis 3" and "axis 4").

However, when attributes of the nodes included in the graph information are defined in a hierarchical structure, an attempt to expand the graph information to tensor-form data would use two or more axes for the attribute information, so that the resultant tensor has four or more axes, including the axes 1 and 2 expressing a connecting matrix of nodes, in total.

When graph information expressed in tensor of four or more axes is input into the DT, information representing that the axes 3 and 4 are the attribute information of the nodes may be lost in calculation, for example, machine learning, using DT, which has a possibility of not obtaining an appropriate processing result.

For example, in the DT, the tensor decomposition is carried out, not distinguishing the partial structure expressed by the tensor of the two axes of the axis 1 and the axis 2 from the partial structure expressed by the tensor of the two axes of the axis 3 and the axis 4, and the machine learning of rule is performed.

Hereinafter, an embodiment of the present invention will now be described with reference to the accompanying drawings. However, the embodiment described below is merely illustrative and is not intended to exclude the application of various modifications and techniques not explicitly described below. For example, the present embodiment can be variously modified and implemented without departing from the scope thereof. In the drawings to be used in the following description, the same reference numbers denote the same or similar parts, unless otherwise specified.

FIG. 1 is a block diagram, schematically illustrating an example of a configuration of a server 1 according to the embodiment. The server 1 illustrated in FIG. 1 is an example of a machine learning apparatus that generates a machine learning model 33 by a deep tensor (DT) that performs deep learning on data having a graph structure, and processes, for example, determines, data having a novel graph structure, using the machine learning model 33.

The server 1 according to the embodiment performs machine learning on the machine learning model 33 by, for example, generating a tensor and using the tensor as an input.

Deep tensor (DT) is deep learning using a tensor as input as described above. In machine learning by the DT, an extracting process that extracts a partial graph structure (core tensor) which contributes to determination from data having a graph structure inputted to a neural network is optimized as well as the training of the neural network. This optimization of the extracting process is achieved by updating the parameters of the tensor decomposition of inputted tensor-form data as well as updating the parameters of the neural network.

Figure 2:
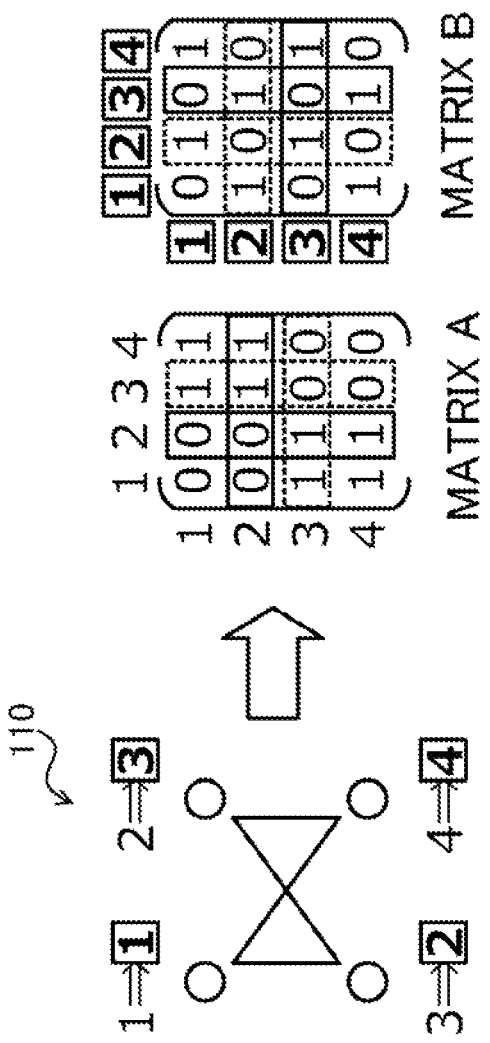
FIG. 2 is a diagram illustrating an example of a relationship between a graph structure and a tensor.

FIG. 2 is a diagram illustrating an example of a relationship between a graph structure and a tensor. In a graph 110 illustrated in FIG. 2, four nodes are connected by edges indicating the relationship between nodes (e.g., "having a correlation coefficient of a predetermined value or more"). This property indicates that there is no relationship between nodes that are not connected by an edge.

When the graph 110 is expressed in a two dimensional tensor, that is, a matrix, for example, the matrix expression based on the number on the left side of each node is expressed in a "matrix A", and the matrix expression based on the number on the right side of each node (the number surrounded by the box) is expressed in a "matrix B". Each component of these matrices is expressed by "1" when nodes are linked (connected) to each other, whereas by "0" when nodes are not linked (connected). In the following description, such a matrix is also referred to as a connecting matrix.

Here, the "matrix B" is obtained by exchanging the second row with the third row and also exchanging the second column with the third column of the "matrix A" at the same time. The DT can ignore the difference in the sequence of the relationships between nodes by using such an exchanging process. In other words, the sequences in "matrix A" and "matrix B" are ignored in DT and these matrices are treated as the same graph. The same process is applied to tensor on the third dimension or higher.

Figure 3:
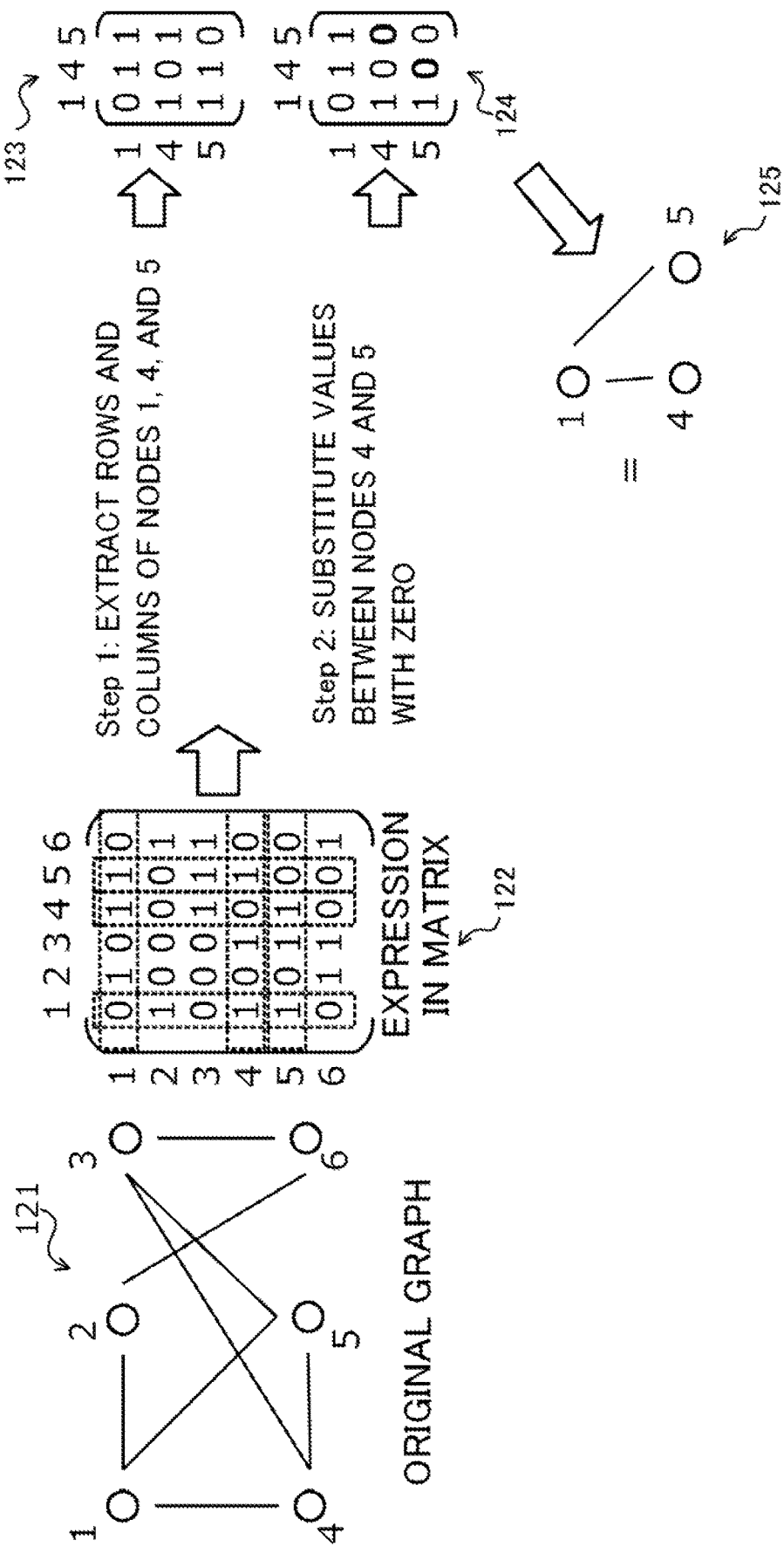
FIG. 3 is a diagram illustrating an example of extraction of a partial graph structure.

FIG. 3 is a diagram illustrating an example of extraction of a partial graph structure. A graph 121 illustrated in FIG. 3 is one in which six nodes are linked by edges. Being expressed in a matrix (tensor), the graph 121 can be expressed as illustrated in a matrix 122. From the matrix 122, a partial graph structure is extracted by combining the following arithmetic operations.

An arithmetic operation that exchanges particular rows with particular columns (see matrix 122 in FIG. 3).

An arithmetic operation that extracts the above particular rows and columns (see "Step 1" and connecting matrix 123 in FIG. 3).

An arithmetic operation of substituting each non-zero element in the connecting matrix 123 with zero (see "Step 2" and matrix 124 in FIG. 3).

For example, extracting a matrix corresponding to nodes 1, 4, and 5 of the matrix 122 (see "Step 1" in FIG. 3) yields a matrix (connecting matrix) 123. Further, focusing on node 1, substituting the values of nodes 4 and 5 except for the node 1 in the connecting matrix 123 to "0" (see "Step 2" in FIG. 3) yields a matrix 124. The partial graph structure corresponding to the matrix 124 is a graph 125.

Such an extracting process of a partial graph structure may be achieved by a mathematical arithmetic operation called tensor decomposition. Tensor decomposition is an arithmetic operation that approximates an inputted tensor of n dimension (where n is an integer of two or more) with a product of a tensor of n dimensions or less. For example, the inputted n-dimension tensor is approximated by a product of one tensor of the n dimension (which may be referred to as a "core tensor") and n tensors of lower dimension (when n>2, tensors of two dimension, i.e., matrices may be used). This decomposition is not univocal and any partial graph structure in the graph structure represented by the inputted data can be included in the core tensor.

Here, the description will now focus on the financial business, for example. In the financial business, a prediction scheme using the data of the table form stored in, for example, a Relational Database Management System (RDBMS) has conventionally been the mainstream. However, if the relationship between nodes can be defined by the DT, data in graph format (graph information) which is easily merged can be applied to the DL technology, which makes advanced prediction possible.

For example, the following description assumes a task that, in the financial business, utilizes transaction history data of between accounts in a bank and supports the credit operations of companies having accounts by DT. In this case, the server, for example, treats the credit operations as a classification task of a machine learning model and crediting results (e.g., company rating) of past transaction relationship of the companies evaluated by a man, as a supervisory label.

Figure 4:
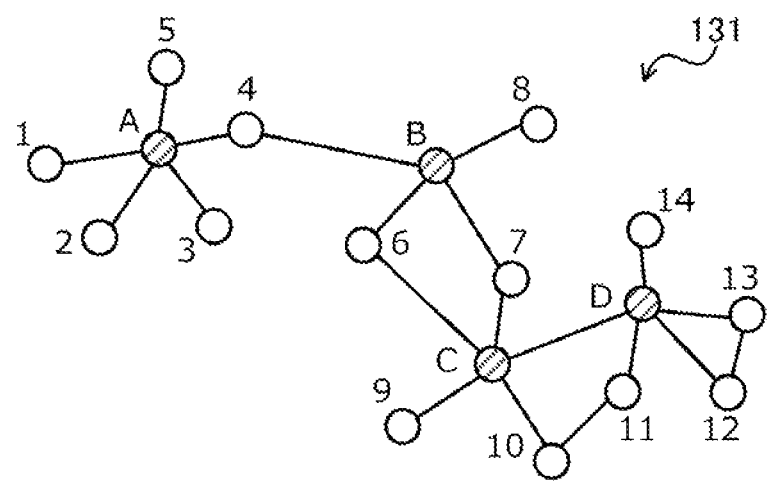
FIG. 4 is a diagram illustrating an example of a graph representing a transaction relationship between companies.

As an example, a graph 131 illustrated in FIG. 4 is obtained by associating each company with an account, associating the relationship of companies with transaction via their accounts, and abstracting actual relationship into data. Although there are multiple types of transaction, the example in FIG. 4 assumes that the data of the transaction relationship can be observed if transaction are made between accounts opened in the same bank. In the graph 131, the white circles and the hatched circles represent companies, specifically the hatched circles indicate target companies for prediction, and solid lines represent transaction relationships between companies.

Figure 5:
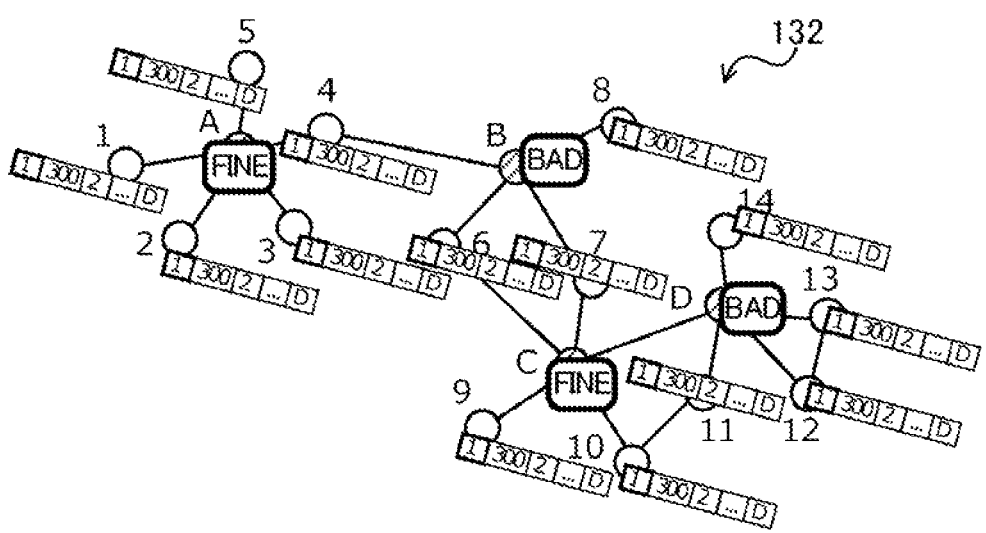
FIG. 5 is a diagram illustrating an example of a graph including attribute information and rating information.

Furthermore, a graph 132 illustrated in FIG. 5 is obtained by defining a characteristic to be subjected to machine learning, such as the attribute information of each company, with a tensor on the basis of a requirement of users such as bank customers, and defining a label of a prediction target as a state desired to be predicted in the graph 131 illustrated in FIG. 4. In the graph 132, the attribute information is represented by a record added to each company (node), and may be, for example, a feature amount and the relationship of the company. Further, in the graph 132, the label of a prediction target is expressed by a frame attached to the company of a prediction target, and may be, for example, rating information such as credit rating or performance value.

For example, as illustrated in FIGS. 4 and 5, the server expresses the transaction relationship between companies in a graph structure based on the connecting relationship between nodes, converts the graph structure into tensor-form data, and inputs the tensor-form data into the DT.

Figure 6:
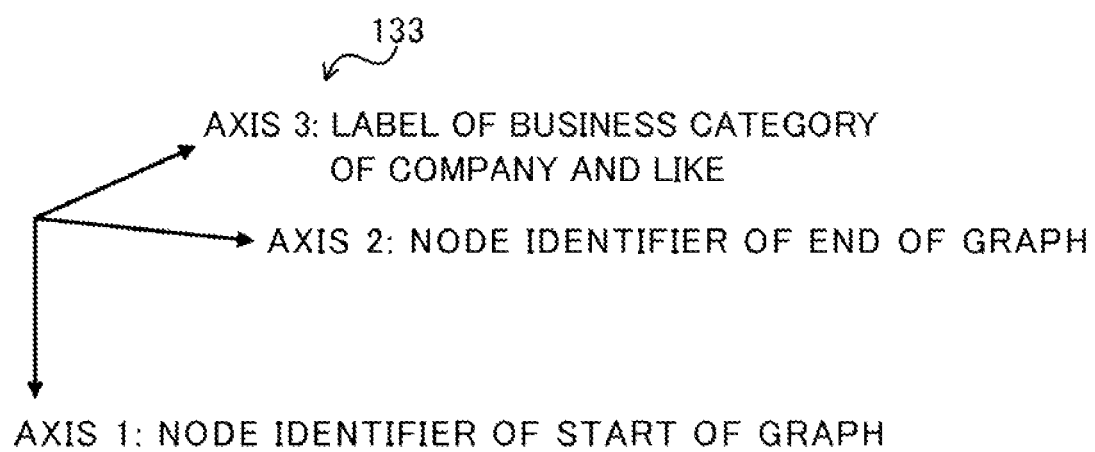
FIG. 6 is a diagram illustrating exemplary tensor-form data.

FIG. 6 is a diagram illustrating exemplary tensor-form data 133. As illustrated in FIG. 6, the tensor-form data 133 expresses a connecting matrix of a graph structure in two axes (e.g., "axis 1" (first axis), "axis 2" (second axis)) of the tensor and expresses the attribute information of the account in other axes (e.g., referred to as "axis 3"). In the example of FIG. 6, the axis 1 represents the node identifier of the start of the graph, the axis 2 represents the node identifier of the end of the graph, and the axis 3 represents a label of the business category of a company, for example.

However, use of simple information such as attribute information of an account in the financial business has a tendency of not yielding a sufficient performance as demonstrated in the natural science field such as chemistry.

Therefore, in order to improve the performance of DT, it is conceivable to increase the information to be used for machine learning by combining with another data held by customers such as banks, for example, to sequentially add an axis of the tensor in accordance with the complexity of the feature structure possessed by the data.

Figure 7:
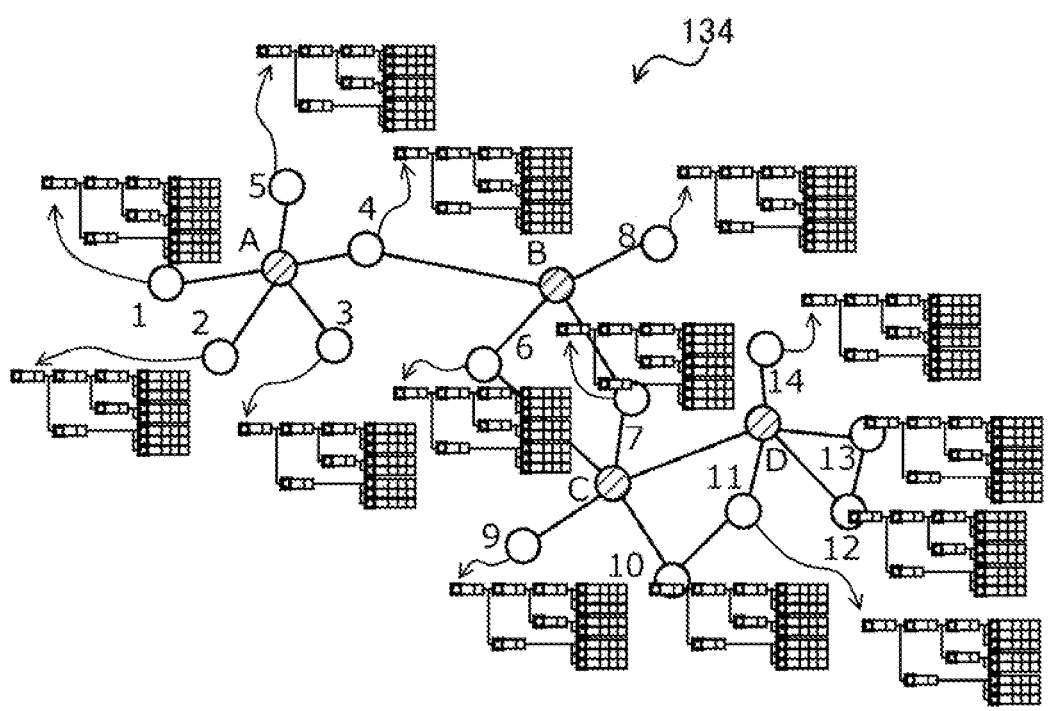
FIG. 7 is a diagram illustrating an example of a graph including attribute information defined in a hierarchical structure.

For example, as illustrated in FIG. 7, a graph 134 in which attribute information (e.g., accounting report information, etc.) attached to each node (company) has attributes defined in a hierarchical structure is assumed.

Figure 8:
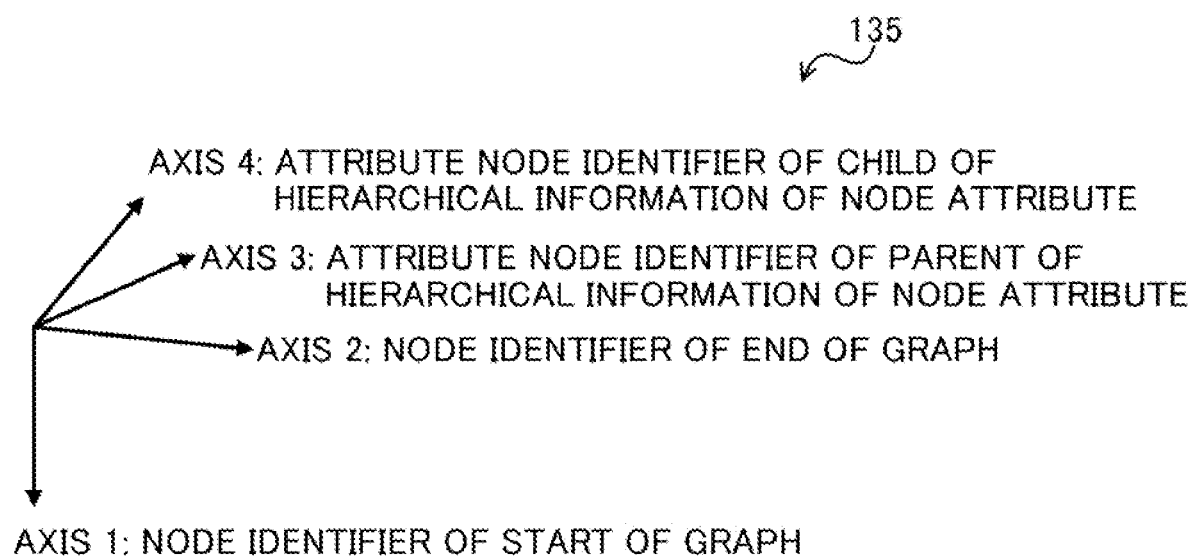
FIG. 8 is a diagram illustrating exemplary tensor-form data converted from the graph illustrated in FIG. 7.

FIG. 8 is a diagram illustrating exemplary tensor-form data 135 converted from the graph 134 illustrated in FIG. 7. The tensor-form data 135 is input-data having a hierarchical structure as attribute information. The tensor-form data 135 includes an axis 1 representing the node identifier of the start of the graph, an axis 2 representing the node identifier of the end of the graph, an axis 3 representing the attribute node identifier of the parent of the hierarchical information of a node attribute, and an axis 4 representing the attribute node identifier of the child of the hierarchical information of the node attribute.

However, it is difficult for the DT to meaningfully treat tensor of two or more dimensions, which is regarded as attribute information (which may be referred to as "labels") of nodes included in the graph information.

For example, even if four-dimensional array data as illustrated in FIG. 8 obtained by adding the hierarchical information of the account data to the graph in a transaction network of companies is used as the input into the DT, an expected processing result is sometimes not obtained.

As an example, even if transaction information of companies and the attribute information are expanded in a four part graph or the like to be expressed in a four-dimensional array data, the information represents that the attribute information is "the attribute of the node" is lost. For example, in the DT, the tensor decomposition is carried out, not distinguishing the partial structure expressed by the tensor of the two axes of the axis 1 and the axis 2 from the partial structure expressed by the tensor of the two axes of the axis 3 and the axis 4, and the machine learning of the rule is performed.

Accordingly, in the DT, the tensor decomposition is carried out without distinguishing the partial structure representing the difference of the "transaction network of companies" from the partial structure representing the difference of the "hierarchical information of account data" in the attribute relationship of the same companies illustrated in FIGS. 7 and 8, and the machine learning of the rule is performed.

Therefore, even if the partial structure representing the difference of the "transaction network of companies" is used for training as a distinguishing rule in the machine learning (training) of the model of DT, the distinguishing rule also matches the partial structure representing the difference in the "hierarchical information of account data" in the attribute relationship of each company. As a result, in the determining processing using a DT that completes machine learning of the model, a false determination is performed, for example, when warning is issued on the basis of rating information, a false warning is output.

As a solution to the above, one embodiment describes a method for enhancing the determination precision of the machine learning on a graph representing the connecting relationship between nodes having the attribute information of the hierarchical structure.

For example, a server 1 according to an embodiment may generate a tensor including a third axis for each combination of a first axis and a second axis indicating the connecting relationship between multiple nodes included in graph information. The third axis may be obtained by combining the data of the first layer among the data having a hierarchical structure representing attribute information of multiple nodes included in the graph information and the data of the second layer of the hierarchical structure such that the data of the first layer can be distinguished from the data of the second layer.

For example, the server 1 may expand input-data of the DT as an element of one axis by synthesizing the information of the axes of the tensor corresponding to the information representing the hierarchical relationship with the original input-data, and generate a tensor in which the expanded element is added as a new axis. As described above, the server 1 according to the embodiment introduces a matrix representing a hierarchical structure such as attribute information, in the form of a new axis developed as an element of one axis, into the tensor rather than simply expanding the matrix to the axis of the tensor, so as not to increase the number of dimensions unavoidably.

Figure 9:
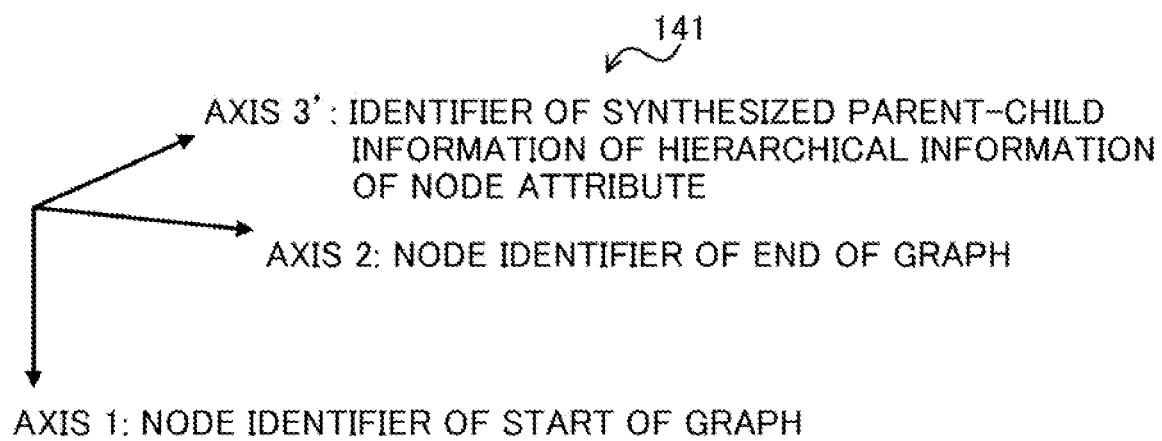
FIG. 9 is a diagram illustrating exemplary tensor-form data generated by the server according to the embodiment.

FIG. 9 is a diagram illustrating exemplary tensor-form data 141 generated by the server 1 according to the embodiment. The tensor-form data 141 may include an axis 1 expressing a node identifier of the start of the graph, an axis 2 expressing a node identifier of the end of the graph, and an axis 3' expressing an identifier of the synthesized parent-child information of the hierarchical information of the node attribute. The axis 3' (the third axis) is a third axis attached to applied to the tensor-form data 141 having the axis 1 and the axis 2, and unlike the axis 3 or the axis 4 illustrated in FIG. 8, is an axis expressing the attribute information or the like of the hierarchical structure.

Thus, the data having the hierarchical structure indicating the attribute information can be expressed by the third axis, in other words, by a single axis. Accordingly, the server 1 can execute the training of the machine learning model 33 by using the tensor having the three axes expressing the connecting relationship between multiple nodes included in the graph information and the attribute information of each node as an input.

Inputting the graph information represented by the tensor of three axes into the DT makes it possible to retain information representing that the third axis is attribute information of nodes in the calculation using the DT, for example, in the training of the machine learning model 33.

As a result, it is possible to suppress or avoid false determination resulting from not distinguishing the information of the network of nodes that the graph information input into the DT assumes and the information of the network of the node attribute from each other. In other words, this makes it possible to use the hierarchical information for the machine learning, so that the information to be used for machine learning can be increased. Therefore, the determination precision of machine learning can be enhanced, and the performance enhancement of the DT can be achieved. For example, it is possible to learn, by means of machine learning, a rule to detect of signs of bankruptcy of a company from the companies accounting information having features in the hierarchical structure by using the DT.

Referring back to the description of FIG. 1, an example of the functional configuration of the server 1 will be described. As illustrated in FIG. 1, the server 1 may illustratively include a communicator 2, a memory unit 3, and a controller 4.

The communicator 2 communicates information with an information processing apparatus such as another computer or a server through a non-illustrated network. The communicator 2 may, for example, receive various data such as data used in the machine-learning phase and data used in the determining phase from the information processing apparatus that the operator uses. In addition, the communicator 2 may transmit various types of information, such as results of machine learning and results of determination, to the information processing apparatus.

The memory unit 3 is an example of a storage area and stores various types of data that the server 1 use. As illustrated in FIG. 1, the memory unit 3 may illustratively be capable of storing input-data 31, tensor-form data 32, and a machine learning model 33.

In the following description, each of the input-data 31 and the tensor-form data 32 will be assumed to be data in a table form or a graph form for convenience, but is not limited thereto and may be in various data forms.

The controller 4 performs various controls on training of the machine learning model 33 using data having a graph structure. The control may include the execution of the DT. As illustrated in FIG. 1, the controller 4 may include for example, an obtainer 41, a generator 42, a machine learner 43, and a determiner 44.

The obtainer 41 may, for example, obtain input-data 31 based on data inputted through the communicator 2 and store the obtained input-data 31 in the memory unit 3. The input-data 31 may be obtained (e.g., received or generated) on the basis of, for example, multiple pieces of data inputted from an external entity exemplified by a non-illustrated information processing apparatus such as a terminal through the communicator 2.

Figure 11:
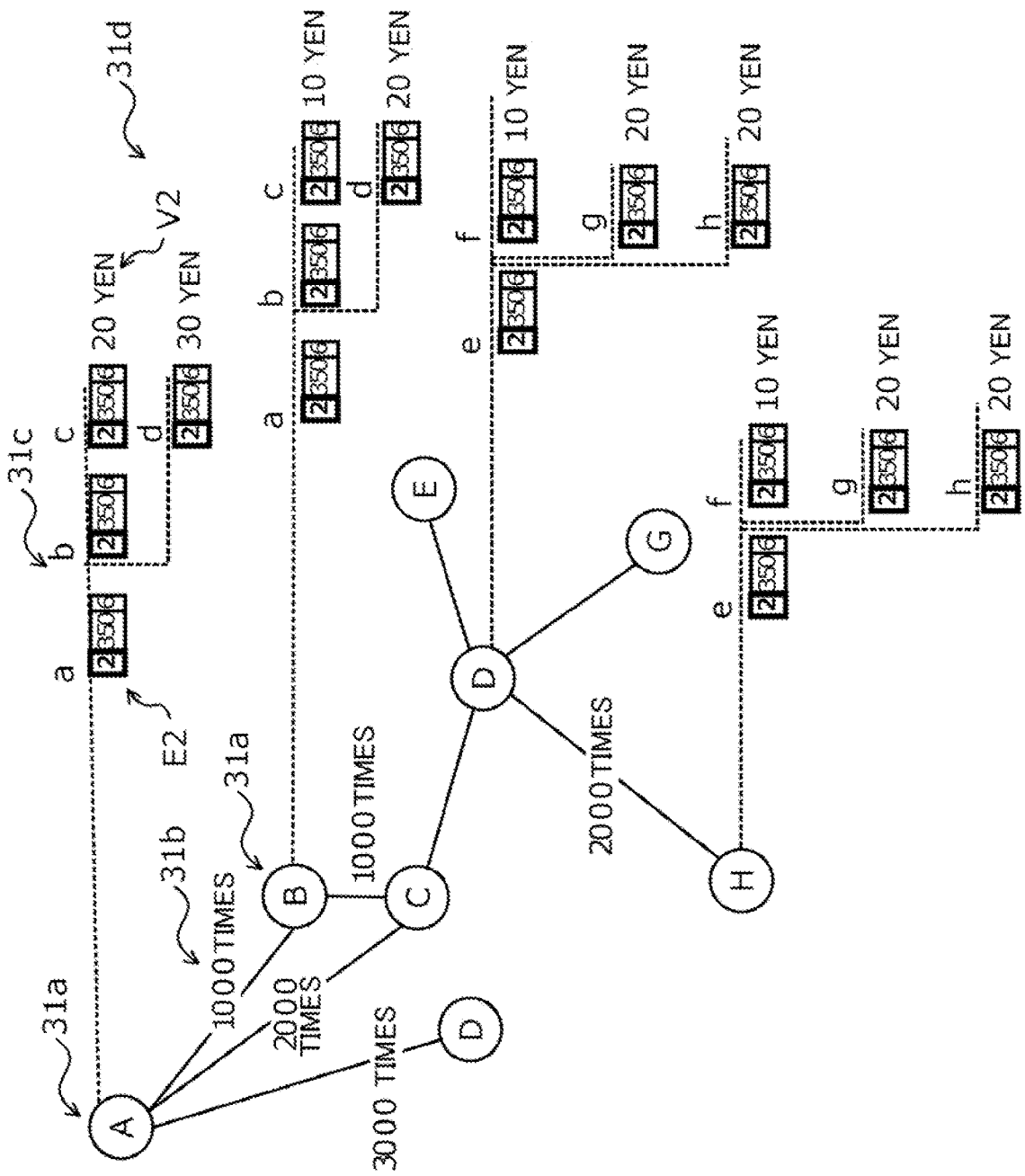
FIG. 11 is a diagram illustrating an example of graph information.

FIG. 10 is a diagram illustrating an example of the input-data 31, and FIG. 11 is a diagram illustrating an example of the graph information. As illustrated in FIG. 10, the input-data 31 may illustratively include node information 31a, connecting information 31b, hierarchical information 31c, and connecting information 31d.

The node information 31a is information indicating an entity in the inter-company network, in other words, nodes in the graph information, and in the example of FIG. 10, may include two-dimensional items P1 and C1. The items P1 and C1 may include directions. For example, of the two nodes, P1 may be a node at the start and C1 may be a node at the end. As illustrated in FIGS. 10 and 11, identifiers of companies A to H, such as IDs or company names may be set as nodes in each of P1 and C1.

The connecting information 31b is information indicating the connecting state between the nodes in the graph information, in other words, between entities in the inter-company network, and in the example of FIG. 10, may include items E1 and V1. The item E1 may be information indicating the presence or absence of connection between the nodes of P1 and C1, and the item V1 may be information related to the connection from P1 to C1 when the nodes of P1 and C1 are connected to each other. As illustrated in FIGS. 10 and 11, the item V1 may, by way of example, indicate the number of times of transfers between the accounts of companies.

As described above, the node information 31a and the connecting information 31b are examples of information indicating the connecting relationship between multiple nodes included in the graph information.

The hierarchical information 31c is information representing an entity in company information (information related to the company), such as accounting information, formed into tree data, in other words, information representing a hierarchical structure expressing an attribute of a node. In the example of FIG. 10, the hierarchical information 31c may include two-dimensional items P2 and C2. The items P2 and C2 may have a hierarchical relationship such as a parent-child relationship. For example, in the hierarchical relationship, the item P2 may be a "parent" layer, which is an example of a first layer, and the item C2 may be a "child" layer, which is an example of a second layer. The relationship between "parents" and "children" of the first layer and the second layer may be opposite. As illustrated in FIGS. 10 and 11, each of the items P2 and C2 may set therein an identifier, e.g., an ID, of the layers a-h as a layer indicating the attribute of the node P1.

The connecting information 31d is information indicating the connecting relationship of the attribute of the hierarchical structure, in other words, information indicating the connecting state of the attribute information, and in the example of FIG. 10, may include items E2 and V2. The item E2 may be information indicating the presence or absence of a connection between the attributes of the hierarchical structures of the items P2 and C2, and the item V2 may be information about the connection between P2 and C2 when the attributes of P2 and C2 are connected. As illustrated in FIGS. 10 and 11, the item V2 may indicate the balance of the account, the amount of transfer, the amount of deposit of a company exemplified by the node P1, for example.

As described above, the hierarchical information 31c and the connecting information 31d are examples of data having a hierarchical structure representing the attribute information of each of multiple nodes included in the graph information.

In the input-data 31, each entry (e.g., each row) may be information that defines at least one of a connecting relationship indicated by the node information 31a and the connecting information 31b, and the attribute information defined in the hierarchical information 31c and the connecting information 31d.

For example, the data of the entry indicated by the reference number (3) is an element mainly expressing information (for example, the node information 31a and the connecting information 31b) related to the inter-company network.

In addition, the data of the entries indicated by the reference numbers (1), (2), and (4) are elements mainly representing the company information (for example, the hierarchical information 31c and the connecting information 31d). In the example of FIG. 10, the data of the entries indicated by the reference numbers (1), (2), and (4) may indicate hierarchical information serving as the attribute information related to the nodes A, E, and H, respectively.

As described above, the input-data 31 is a list of the connecting information related to the connecting relationship between nodes and attribute information for each entry (row). The input-data 31 is an example of an expression format for providing the label information of a node to the edge list of the graph information as illustrated in FIG. 11.

The hierarchical information 31c and the connecting information 31d, which are examples of data having the hierarchical structure, may be generated outside the server 1 (for example, an information processing apparatus) along with the node information 31a and the connecting information 31b. Alternatively, the obtainer 41 may generate the hierarchical information 31c and the connecting information 31d on the basis of the original data obtained from the information processing apparatus. The following discussion assumes that the input-data 31 is generated by the obtainer 41.

From the use cases in the financial business, accounting data is listed as information that is expected to be input. The accounting data is an example of attribute information defined in a hierarchical structure. For example, since a company's security report is electronically disclosed under laws and regulations related to the disclosure of company contents, the accounting report information contained in a valuable security report can be extracted as the accounting data.

A security report is generated by using, for example, a language for describing business reports such as Extensible Business Reporting Language (XBRL). A document described in the XBRL is based on Extensible Markup Language (XML) which is extensible and has a hierarchical structure, and therefore can be machine-analyzed.

Therefore, the obtainer 43 can data-abstract the accounting data, using each company, each item, and values thereof as attribute values of the multiple layer, that is, can convert the accounting data into a graph-structure. For example, the obtainer 41 may capture, as the graph information, a financial statement in the form of numerical data and non-financial information in the form of text data.

In addition, the obtainer 41 may attach supervisory data (which may be referred to as ""supervisory label") to the input-data 31 in the machine-learning phase. As an example, the supervisory data may be a crediting result exemplified by information of company rating (see "rating information" in FIG. 5) evaluated on the past transaction relationship of the companies by a man. The supervisory data may be input into the server 1 via communicator 2, for example, from outside the server 1 (e.g., information processing apparatus).

The generator 42 generates tensor-form data 32 based on the input-data 31 obtained by the obtainer 41.

Figure 12:
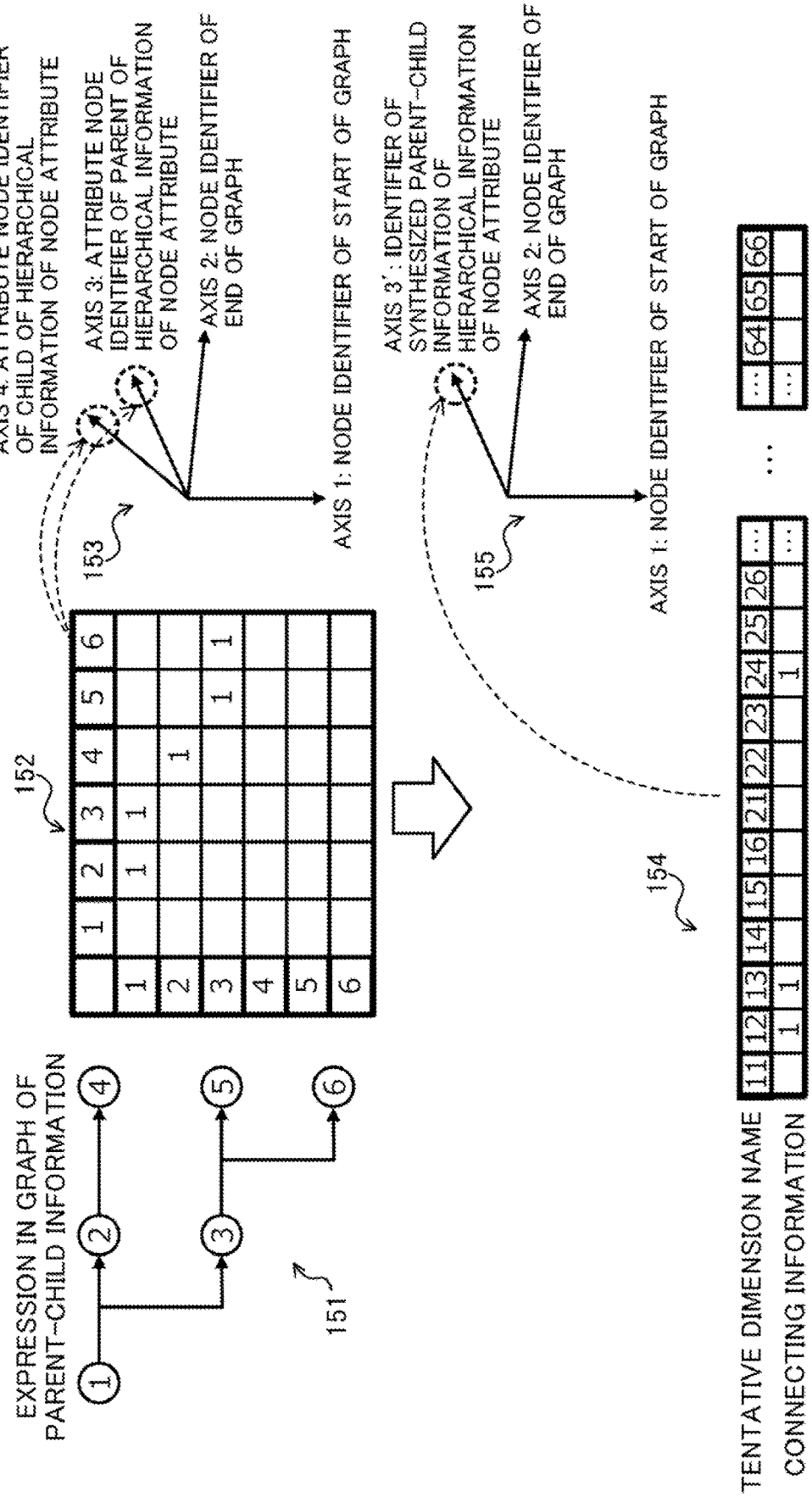
FIG. 12 is a diagram illustrating an example of an operation of a generating process by a generator.

FIG. 12 is a diagram illustrating an example of an operation of a generating process by the generator 42. FIG. 12, the graph 151 is assumed to be the parent-child information of the attribute information. The graph 151 is an example of graph expression of the parent-child information of the hierarchical relationship indicated by the hierarchical information 31c and the connecting information 31d included in the input-data 31.

The parent-child information composed of the axis 3 and axis 4 extracted from the parent-child information of the input-data 31 expressed in a graph 151 is expressed in a two-dimensional tensor 152. The two dimensional tensor 152 corresponds to the axis 3 and the axis 4 of the tensor-form data 153. This means that, like tensor-form data 135 illustrated in FIG. 8, each of the axis 3 and the axis 4 indicates the attribute node identifier of the parent of the hierarchical information of the node attribute and the attribute node identifier of the child of the hierarchical information.

In contrast, the generator 42 according to the embodiment generates an axis 3' obtained by synthesizing parent-child information represented by the axis 3 and the axis 4.

For example, the generator 42 generates a new dimension, i.e., the axis 3', in other words, a one-dimensional tensor 154, by performing an operation of arranging values on a row of a matrix representing the parent-child information of the input-data 31 into a vector. The generated new dimension is defined as the direct product of the dimension of the information corresponding to the axis 3 in the original the input-data 31 and the dimension corresponding to the axis 4 in the original input-data 31.

Incidentally, the generator 42 is assumed to perform an operation of arranging the values on a "row" of the matrix representing the parent-child information in the input-data 31 into a vector, but the operation is not limited to this. Alternatively, the operation may select any "column" of the matrix representing the parent-child information.

In the tensor 154 of the example of FIG. 12, a value corresponding to the result of synthesizing a "row" and a "column" of the parent-child information, in other words, the information corresponding to the combination of P2 and C2 in the hierarchical information 31c is set in the "tentative dimension name". For example, when being indicated by using the tensor 152 of the parent-child information, the "tentative dimension name" "12" corresponds to the "first" row and the "second" column.

In the "connecting information" in the tensor 154, information corresponding to the connecting information 31d of the "tentative dimension name" is set. For example, in the "connecting information" of the "tentative dimension name" of "12", "13", and "24" in the tensor 154, the values "1" respectively set at the intersections of the "first row" and the "second column", the "first row" and the "third column", and the "second row" and the "fourth column" are set.

The one-dimensional tensor 154 corresponds to the axis 3' of the tensor-form data 155. That is, the axis 3' indicates an identifier obtained by synthesizing parent-child information of the hierarchical information of the node attribute, similar to the tensor-form data 141 illustrated in FIG. 9.

The generator 42 may generate the tensor-form data 32 including the axis 1, the axis 2, and the axis 3' by generating a tensor 154 for each connecting relationship of multiple nodes included in the graph information obtained from the input-data 31, in other words, for each combination of the axis 1 and the axis 2.

Figure 13:
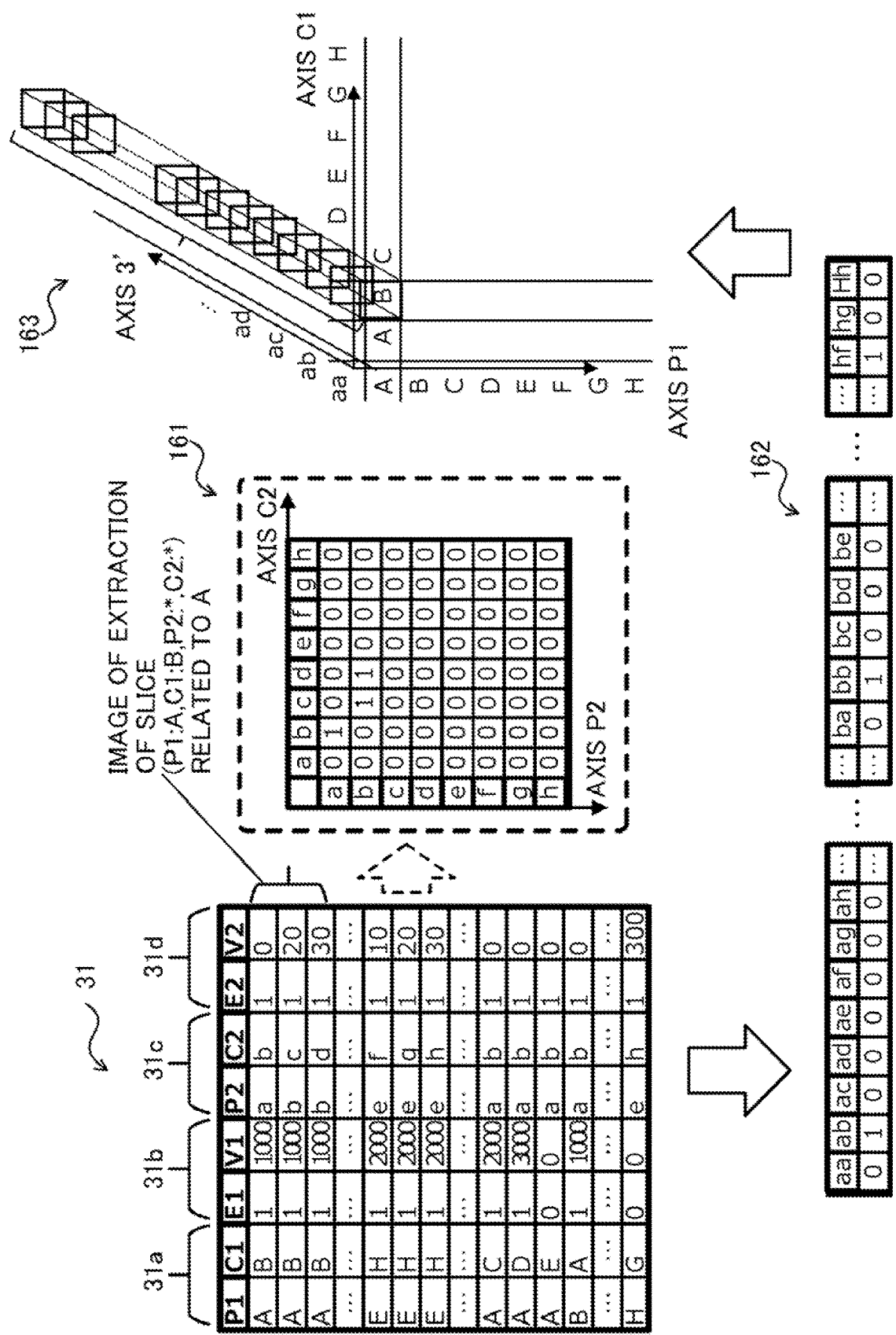
FIG. 13 is a diagram illustrating an example of the generating process by the generator.

FIG. 13 is a diagram illustrating an example of a generating process performed by the generator 42. In the example of FIG. 13, the generating process of the tensor-form data 32 when the input-data 31 illustrated in FIG. 10 is inputted will be described.

As illustrated in FIG. 13, the generator 42, for example, generates a one dimensional tensor 162 for each node information 31a in the input-data 31.

In the example of FIG. 13, the generator 42 generates a tensor 162 based on the hierarchical information 31c and the connecting information 31d included in a slice in which C1 is "B" in a slice in which P1 is "A" in the node information 31a. A slice may be one or more entries having a common (identical) P1 or C1 of the node information 31a in the input-data 31. In the example of FIG. 13, the generator 42 extracts three entries on a condition that a slice of C1 having "B" in a slice of P1 having "A", i.e., (P1: A, C1: B, P2: *, C2: *) where P1 is "A" and C1 is "B".

The slice extracted in the above manner can be expressed in a two-dimensional tensor 161 that uses P2 and C2 in the slice as axes as enclosed by a broken lines in FIG. 13.

The generator 42 synthesizes the information of the above extracted slices that can be expressed in the two-dimensional tensor 161 into a one-dimensional tensor 162 by performing an arithmetic operation on the information of the extracted slices, using a vectorization operator such that the information of slices can be distinguished from each other. Here, an example of the information of the extracted slices is the information of a second slice of the axis 2 extracted from a first slice extracted from the axis 1.

In other words, the generator 42 generates a tensor 162 such that an i-th first slice on the first axis extracted from the input-data 31 and a j-th second slice on the second axis extracted from the first slice are associated with a vector returned by an arithmetic operation using a vectorization operator performed on a two-dimensional tensor 161 expressed in the parent-child information of the attribute information. Here, i is an integer of 1 or more and I or less, j is an integer of 1 or more and J or less. The number I is an integer indicating the number of nodes (entities) of P1, in other words, the number of nodes included in the axis 1, and the number J is an integer indicating the number of nodes (entities) of C1, in other words, the number of nodes included in the axis 2.

The generator 42 places the one-dimensional tensor 162 generated in the above manner as a slice (in the example of FIG. 13 (P1: A, C1: B, 3': *)) of a tensor used as an input into the machine learning model 33 onto the tensor-form data 163 having the three axes of the axis 1, the axis 2, and the axis 3'.

The generator 42 generates the tensor-form data 32 by generating the tensors 162 of all the combinations of i and j, varying i from 1 to I and also varying j from 1 to J, and placing the generated tensors 162 in the tensor-form data 163. Namely, it can be considered that the generator 42 reconstructs, based on the input-data 31, the "tensor-form data" that can be expressed in four dimensions into the tensor-form data 32 expressed in three dimensions.

Incidentally, the example illustrated in FIGS. 12 and 13 illustrate, for explanation, two-dimensional tensors 152 and 161 and the axis 3 and axis 4 related to the parent-child information, but these pieces of information do not have to be always used (which may be omitted). This means that the above manner allows the generator 42 to generate the tensor-form data 32 (163) from the input-data 31 without generating the two-dimensional tensors 152 and 161, the axis 3, and the axis 4.

When a training instruction of the machine learning model 33 is input via the communicator 2 or a non-illustrated input device of the server 1, the machine learner 43 performs training of the machine learning model 33 by, for example, generating or updating of the machine learning model 33 based on the tensor-form data 32 generated by the generator 42. Training of the machine learning model 33 may be performed by inputting the tensor-form data 32 having three axes into the DT.

For example, the machine learner 43 refers to tensor-form data 32 and carries out tensor-decomposition on the tensor-form data 32 in response to input of the training instruction to generate a core tensor (partial graph structure). The machine learner 43 inputs the generated core tensor into the neural network and obtains the output. The machine learner 43 executes machine learning such that the error of the output value comes to be small, and updates the parameter of the tensor decomposition so that the determination precision come to be high.

As an example, in cases where supervisory data is attached to the input-data 31, the machine learner 43 updates the parameters of the neural network and the parameters of the tensor decomposition on the basis of an error (a loss function) between the output value from the neural network and the supervisory data such that the error comes to be smaller.

The machine learner 43 ends the machine learning when machine learning is executed a predetermined number of times, or when an error comes to be smaller than a predetermined value, and stores various parameters, a method of the tensor decomposition and the like, as the machine learning model 33, into the memory unit 3. Here, the neural network may be any neural network such as a Recurrent Neural Network (RNN). The manner of the machine learning method can also apply various techniques such as the extended error back propagation method.

As the above, the machine learner 43 tensor-decomposes the generated tensor-form data 32 serving as an input, and in the deep-learning phase, inputs the decomposed tensor into the neural network, performs deep-learning of the neural network, and machine-learns the method of tensor-decomposition.

After the training of the machine learning model 33 by the machine learner 43, the determiner 44 outputs the result of determination by means of the trained machine learning model 33 that has completed the training, using new tensor-form data 32 as an input.

For example, when receiving a new (target for determination) input-data 31 from an information processing apparatus or the like via the communicator 2, the obtainer 41 may store the received input-data 31 as the target input-data 31 for determination into the memory unit 3. The generator 42 may generate the tensor-form data 32 of the target for the determination, using the input-data 31 of the target determination in the above manner, and store the generated tensor-form data 32 into the memory unit 3.

The determiner 44 refers to the memory unit 3 and distinguishes the generated tensor-form data 32 of the target for determination, using the machine learning model 33 that has completed the training. For example, the determiner 44 may construct a neural network in which various parameters of the machine learning model 33 that has completed the training are set, and set a manner of tensor decomposition. Then, the determiner 44 tensor-decomposes the generated tensor-form data 32 of the determination target, obtains the determination result by inputting the tensor-form data 32 into the neural network, and outputs the obtained determination result.

The output of the determination result includes, for example, displaying on an output device such as a monitor, storing into the memory unit 3 or the storage device, and transmitting to the outside of the server 1 via the communicator 2.

As described above, according to the server 1 of the embodiment, a graph expressing a connecting relationship between nodes having attribute information defined in a hierarchical structure can be appropriately used for machine learning. This makes it possible to suppress the erroneous determination in the machine learning on the graph, in other words, to enhance the determination precision.

Hereinafter, an example of the operation of the server 1 described above will now be described with reference to flowcharts.

Figure 14:
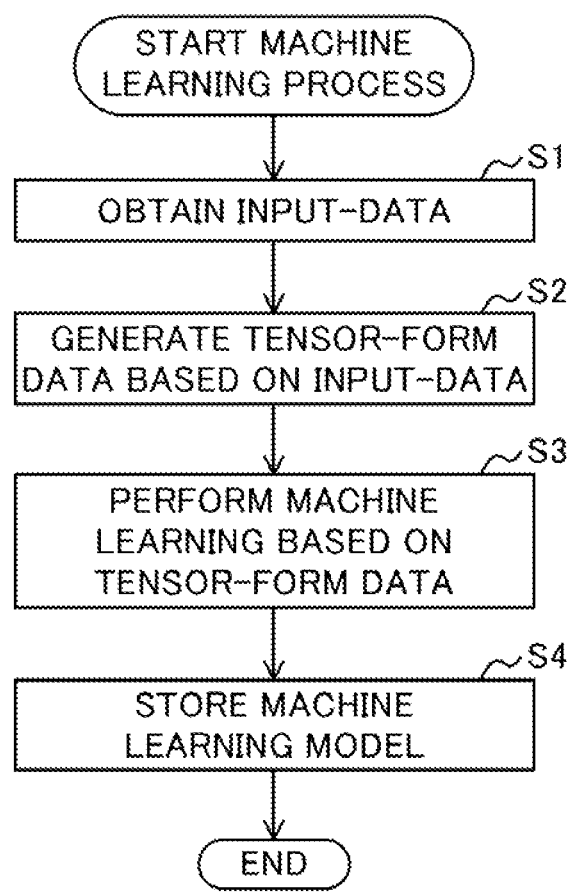
FIG. 14 is a flowchart illustrating an example of an operation of a machine learning process of the server according to the embodiment.

FIG. 14 is a flowchart illustrating an example of an operation of a machine learning process of the server 1 according to the embodiment.

As illustrated in FIG. 14, in the controller 4 of the server 1, the obtainer 41 obtains the input-data 31 based on multiple data groups for machine learning that are input from an information processing apparatus used by the operator or the like via the communicator 2 (Step S1), and stores the obtained input-data 33 into the memory unit 3. Incidentally, the obtainer 41 may attach the supervisory data to the input-data 31. Besides, the obtainer 41 may output a generating instruction to the generator 42 after storing the input-data 31 into the memory unit 3. As illustrated in FIG. 10, the input-data 31 may include the node information 31a, the connecting information 31b, the hierarchical information 31c, and the connecting information 31d.

When the generating instruction is input from the obtainer 41, for example, the generator 42 generates a tensor-form data 32 based on the input-data 31 (Step S2), and stores the generated tensor-form data 32 into the memory unit 3. The tensor-form data 32 may be a tensor of three axes of the axis 1, the axis 2, and the axis 3', as illustrated in FIGS. 12 and 13.

For example, as illustrated in FIGS. 12 and 13, the generator 42 may generate the axis 3' by synthesizing the parent-child information of the hierarchical information based on the hierarchical information 31c and the connecting information 31d included in the input-data 31. The generator 42 may output a machine-learning instruction to the machine learner 43 after storing the tensor-form data 32 into the memory unit 3.

For example, when a machine learning instruction is input from the generator 42, the machine learner 43 refers to the memory unit 3 and perform machine learning based on the tensor-form data 32 (Step S3). The machine learner 43 ends machine learning when the machine learning is executed a predetermined number of times or when an error between the output value of the neural network and the supervisory data comes to be smaller than a predetermined value, for example. Then, the machine learner 43 stores the various parameters of a neural network and tensor decomposition or the like as a machine learning model 33 into the memory unit 3 (Step S4), and ends the process.

Consequently, the server 1 can machine-learn the relationship between nodes including data having a hierarchical structure representing the attribute information of the node. Further, since the server 1 can machine-learn the data having a graph structure including the attribute information of the hierarchical structure as an input, the server 1 can apply the input-data which would originally be composed of four or more axes (FIG. 8) to the DT.

Figure 15:
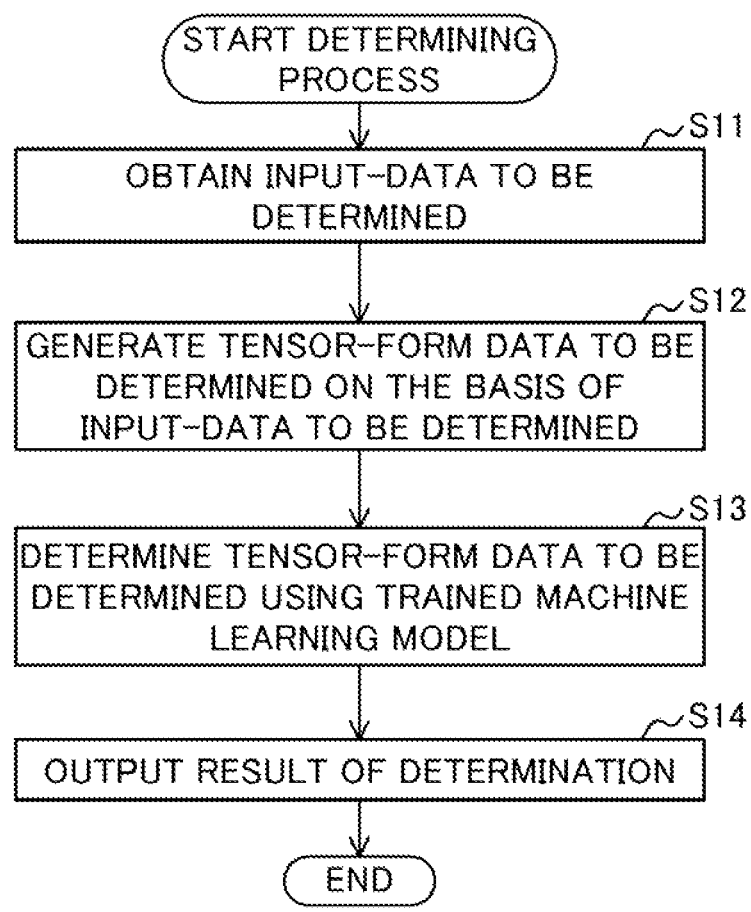
FIG. 15 is a flowchart illustrating an example of an operation of a determining process by the server according to the embodiment.

FIG. 15 is a flowchart illustrating an operation example of a determining process by the server 1 according to the embodiment.

As illustrated in FIG. 15, in the controller 4 of the server 1, the obtainer 41 obtains the input-data 31 of the target for determination based on multiple data groups of the target for determination that are input from an information processing apparatus used by the operator or the like via the communicator 2 (Step S11), and stores the obtained input-data 31 into the memory unit 3. Besides, the obtainer 41 may output a generating instruction to the generator 42, after storing the input-data 31 of the target for determination into the memory unit 3. As illustrated in FIG. 10, the input-data 31 of the target for determination may include the node information 31a, the connecting information 31b, the hierarchical information 31c, and the connecting information 31d like the input-data for machine learning.

When the generating instruction is input from the obtainer 41, for example, the generator 42 generates a tensor-form data 32 of the target for determination based on the input-data 31 of the target for determination (Step S12), and stores the generated tensor-form data 32 of the target for determination into the memory unit 3. As illustrated in FIGS. 12 and 13, the tensor-form data 32 of the target for determination may be a tensor of three axes of the axis 1, the axis 2, and the axis 3' like the tensor-form data 32 for machine learning.

For example, as illustrated in FIGS. 12 and 13, the generator 42 may generate the axis 3' by synthesizing the parent-child information of the hierarchical information based on the hierarchical information 31c and the connecting information 31d included in the input-data 31 of the target for determination. The generator 42 may output a determining instruction to the determiner 44, after storing the tensor-form data 32 of the target of determination into the memory unit 3.

The generator 42 may determine whether the tensor-form data 32 is a target for the machine learning or a target for the determination on the basis of an instruction when receiving the data group from the information processing apparatus.

When the determining instruction is input from the generator 42, for example, the determiner 44 refers to the memory unit 3 and determines the tensor-form data 32 of the determination target using the machine learning model 33 that has completed the machine learning (Step S13). The determiner 44 outputs the result of determination made on the trained machine learning model 33 (Step S14), and ends the process.

This allows the server 1 to determine the data having a graph structure including the attribute information of the hierarchical structure.

The method according to the embodiment can be applied to various fields and business. As an example, for the financial business described in the embodiment, it is possible to apply the method according to the embodiment to various operations, such as company credit rating operations, credit screening operations, and company matching support operations that recommend new transactions between companies.

The server 1 according to the embodiment may be a virtual server (Virtual Machine (VM)) or a physical server. The function of the server 1 may be achieved by one computer or by two or more computers. Further, at least some of the functions of the server 1 may be implemented using Hardware (HW) resources and Network (NW) resources provided by cloud environment.

FIG. 16 is a block diagram schematically illustrating an example of the hardware (HW) configuration of a computer 10 that achieves the function of the server 1. If multiple computers are used as the HW resources for achieving the functions of the server 1, each of the computers may include the HW configuration illustrated in FIG. 16.

As illustrated in FIG. 16, as an HW configuration, the computer 10 may illustratively include a processor 10*a*, a memory 10*b*, a storing device 10*c*, an interface (IF) device 10*d*, an Input/Output (IO) device 10*e*, and a reader 10*f*.

The processor 10*a* is an example of an arithmetic operation processor that performs various controls and arithmetic operations. The processor 10*a* may be communicably connected to the blocks in the computer 10 via a bus 10*i*. The processor 10*a* may be a multiprocessor including multiple processors, may be a multicore processor having multiple processor cores, or may have a configuration having multiple multicore processors.

Examples of the processor 10*a* include an integrated circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA). The processor 10*a* may be a combination consisting of two or more of these ICs.

The memory 10*b* is an example of a HW device that stores various types of data and information such as a program. Examples of the memory 10*b* include one or both of a volatile memory such as a Dynamic Random Access Memory (DRAM) and a non-volatile memory such as Persistent Memory (PM).

The storing device 10*c* is an example of a HW device that stores various types of data and information such as program. Examples of the storing device 10*c* include a magnetic disk device such as a Hard Disk Drive (HDD), a semiconductor drive device such as a Solid State Drive (SSD), and various storing devices such as a nonvolatile memory. Examples of the non-volatile memory include a flash memory, a Storage Class Memory (SCM), and a Read Only Memory (ROM).

The storing device 10*c* may store a program 10*g* (machine learning program) that implements all or part of various functions of the computer 10.

For example, the processor 10*a* of the server 1 can achieve the function as the server 1 (e.g., the communicator 2 and the controller 4) illustrated in FIG. 1 by expanding the program 10*g* stored in the storing device 10*c* into the memory 10*b* and executing the expanded program 10*g*. The memory unit 3 illustrated in FIG. 1 may be implemented by a storage area possessed by at least one of the memory 10*b* and the storing device 10*c*. Further, the determiner 44 illustrated in FIG. 1 may output and store a result of determination into at least one of the memory 10*b* and the storing device 10*c* serving as an example of storage device.

The IF device 10*d* is an example of a communication IF that controls connection and communication with a network. For example, the IF device 10*d* may include an adapter complying with a Local Area Network (LAN) such as Ethernet (registered trademark) or optical communication such as a Fibre Channel (FC). The adapter may be compatible with one of or both wireless and wired communication schemes. For example, the server 1 may be communicably connected to a non-illustrated information processing apparatus via the IF device 10*d*. At least some of the functions of the communicator 2 illustrated in FIG. 1 may be implemented by the IF device 10*d*. Further, for example, the program 10*g* may be downloaded from the network to the computer 10 and stored in the storing device 10*c* via the communication IF.

The I/O device 10*e* may include one of or both an input device and an output device. Examples of the input device include a keyboard, a mouse, and a touch panel. Examples of the output device include a monitor, a projector, and a printer. For example, the determiner 44 illustrated in FIG. 1 may output and display the result of the determination to and on the output device of the IO unit 10*e*.

The reader 10*f* is an example of a reader that reads data and programs recorded in the recording medium 10*h*. The reader 10*f* may include a connecting terminal or device to which the recording medium 10*h* can be connected or inserted. Examples of the reader 10*f* include an adapter conforming to, for example, Universal Serial Bus (USB), a drive apparatus that accesses a recording disk, and a card reader that accesses a flash memory such as an SD card. The program 10*g* may be stored in the recording medium 10*h*, and the reader 10*f* may read the program 10*g* from the recording medium 10*h* and store the read program 10*g* into the storing device 10*c*.

The recording medium 10*h* is example of a non-transitory computer readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the computer 10 described above is exemplary. Accordingly, the computer 10 may appropriately undergo increase or decrease of HW devices (e.g., addition or deletion of arbitrary blocks), division, integration in an arbitrary combination, and addition or deletion of the bus. For example, the server 1 may omit at least one of the I/O device 10*e* and the reader 10*f*.

The technique according to the one embodiment described above can be implemented by changing or modifying as follows.

For example, the communicator 2 and the controller 4 that the servers 1 illustrated in FIG. 1 includes may be merged or may be each divided. The obtainer 41, the generator 42, the machine learner 43, and the determiner 44 that the server 1 illustrated in FIG. 1 may be merged in any combination, or may be each divided.

The server 1 illustrated in FIG. 1 may have a configuration that achieves each processing function by multiple apparatuses cooperating with each other via a network. As an example, the communicator 2 may be a web server, the controller 4 may be an application server, the memory unit 3 may be a DB server. In this case, these processing functions as the server 1 may be achieved by the web server, the application server, and the DB server cooperating with one another via a network.

In one aspect, at least one of embodiments of the present invention can enhance the determination precision of the machine learning on a graph representing the connecting relationship between nodes having attribute information defined in the hierarchical structure.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a machine learning program executable by one or more computers, the machine learning program comprising:
an instruction for collecting, from a memory, graph information including a plurality of nodes and data representing attributes of the plurality of nodes, the attributes being a hierarchical structure,
an instruction for generating a tensor being three dimensional structured data and comprising a first axis, a second axis, and a third axis, the first axis and the second axis representing relationships of the plurality of nodes included in the graph information, the third axis representing separately first data included in a first layer of the hierarchical structure and second data included in a second layer of the hierarchical structure, and
an instruction for training a machine learning model by using the tensor being the three dimensional structured data as an input, wherein
the generating of the tensor comprises generating the third axis representing the attributes by synthesizing, for each combination of a value of the first data and a value of the second data, the first data and the second data such that the first data and the second data according to the combination are distinguished from each other, and
the training comprises inputting a core tensor obtained by performing tensor decomposition of the tensor into the machine learning model, updating a parameter of a neural network of the model, and updating a parameter of the tensor decomposition.

2. The non-transitory computer-readable recording medium according to claim 1, wherein
the generating of the tensor comprises generating the third axis by synthesizing, for each combination of nodes selected from the plurality of nodes, the first data and the second data related to one node of the combination such that the first data in the third axis is distinguished from the second data in the third axis.

3. The non-transitory computer-readable recording medium according to claim 2, wherein
the generating of the tensor comprises performing an arithmetic operation, by using a vectorization operator, on information of a second slice of the second axis extracted from a first slice extracted from the first axis.

4. The non-transitory computer-readable recording medium according to claim 1, the machine learning program further comprising an instruction for outputting a result of determination obtained by inputting a tensor including a first axis, a second axis, and a third axis that are generated, based on other graph information, into the machine learning model after the training.

5. The non-transitory computer-readable recording medium according to claim 1, wherein
the first layer is an upper layer compared with the second layer.

6. A machine learning apparatus comprising:
a memory that stores graph information including a plurality of nodes and data representing attributes of the plurality of nodes, the attributes being a hierarchical structure; and
a processor coupled to the memory, the processor being configured to:
perform collection of the graph information from the memory,
perform generation of a tensor being three dimensional structured data and comprising a first axis, a second axis, and a third axis, the first axis and the second axis representing relationships of the plurality of nodes included in the graph information, the third axis representing separately first data included in a first layer of the hierarchical structure and second data included in a second layer of the hierarchical structure, and
perform training of a machine learning model by using the tensor being the three dimensional structured data as an input, wherein
the generation of the tensor comprises generating the third axis representing the attributes by synthesizing, for each combination of a value of the first data and a value of the second data, the first data and the second data such that the first data and the second data according to the combination are distinguished from each other, and
the training comprises inputting a core tensor obtained by performing tensor decomposition of the tensor into the machine learning model, updating a parameter of a neural network of the model, and updating a parameter of the tensor decomposition.

7. The machine learning apparatus according to claim 6, wherein
the generation includes generating the third axis by synthesizing, for each combination of nodes selected from the plurality of nodes, the first data and the second data related to one node of the combination such that the first data in the third axis is distinguished from the second data in the third axis.

8. The machine learning apparatus according to claim 7, wherein
the generation includes performing an arithmetic operation, by using a vectorization operator, on information of a second slice of the second axis extracted from a first slice extracted from the first axis.

9. The machine learning apparatus according to claim 6, wherein the processor is further configured to output a result of determination obtained by inputting a tensor including a first axis, a second axis, and a third axis that are generated, based on other graph information, into the machine learning model after the training.

10. The machine learning apparatus according to claim 6, wherein:
the first layer is an upper layer compared with the second layer.

11. A computer-implemented method for machine learning comprising:
performing collection, from a memory, of graph information including a plurality of nodes and data representing attributes of the plurality of nodes, the attributes being a hierarchical structure,
performing generation of a tensor being three dimensional structured data and comprising a first axis, a second axis, and a third axis, the first axis and the second axis representing relationships of the plurality of nodes included in the graph information, the third axis representing separately first data included in a first layer of the hierarchical structure and second data included in a second layer of the hierarchical structure, and
performing training of a machine learning model by using the tensor being the three dimensional structured data as an input, wherein
the generation of the tensor comprises generating the third axis representing the attributes by synthesizing, for each combination of a value of the first data and a value of the second data, the first data and the second data such that the first data and the second data according to the combination are distinguished from each other, and the training comprises inputting a core tensor obtained by performing tensor decomposition of the tensor into the machine learning model, updating a parameter of a neural network of the model, and updating a parameter of the tensor decomposition.

12. The method according to claim 11, wherein the generation includes generating the third axis by synthesizing, for each combination of nodes selected from the plurality of nodes, the first data and the second data related to one node of the combination such that the first data in the third axis is distinguished from the second data in the third axis.

13. The method according to claim 12, wherein the generation includes performing an arithmetic operation, by using a vectorization operator, on information of a second slice of the second axis extracted from a first slice extracted from the first axis.

14. The method according to claim 11, further comprising outputting a result of determination obtained by inputting a tensor including a first axis, a second axis, and a third axis that are generated, based on other graph information, into the machine learning model after the training.

15. The method according to claim 11, wherein:

the first layer is an upper layer compared with the second layer.

* * * * *